(12) United States Patent
Liu et al.

(10) Patent No.: US 11,059,427 B2
(45) Date of Patent: Jul. 13, 2021

(54) STORAGE BOX LATCH WITH A REMOTELY LOCATED MECHANICAL PUSH BUTTON

(71) Applicant: Ford Global Technologies, LLC, Dearborn, MI (US)

(72) Inventors: Frank Qiukui Liu, Canton, MI (US); Glenn Biddinger, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 16/441,123

(22) Filed: Jun. 14, 2019

(65) Prior Publication Data

US 2020/0391664 A1 Dec. 17, 2020

(51) Int. Cl.
*B60R 7/06* (2006.01)
(52) U.S. Cl.
CPC ..................................... *B60R 7/06* (2013.01)
(58) Field of Classification Search
CPC ........................................................ B60R 7/06
USPC ...................................................... 296/37.12
See application file for complete search history.

(56) References Cited

U.S. PATENT DOCUMENTS

| 4,886,311 | A | 12/1989 | Trube et al. |
| 4,896,520 | A | 1/1990 | Bruhnke et al. |
| 5,987,944 | A | 11/1999 | Brekiewicz et al. |
| 6,164,711 | A * | 12/2000 | Neal ........................ B60R 7/06 292/123 |
| 7,775,566 | B2 | 8/2010 | Hanjono et al. |
| 8,353,549 | B2 | 1/2013 | Buchheit |
| 8,740,262 | B2 * | 6/2014 | Buchheit ............... E05B 63/242 292/163 |
| 9,487,151 | B2 | 11/2016 | Roupe et al. |
| 2012/0175891 | A1 | 7/2012 | Buchheit |
| 2012/0261937 | A1 | 10/2012 | Buchheit |

* cited by examiner

*Primary Examiner* — Joseph D. Pape
*Assistant Examiner* — Dana D Ivey
(74) *Attorney, Agent, or Firm* — David L. Coppiellie; Price Heneveld LLP (57) ABSTRACT

A storage bin assembly for vehicles includes a bin and a door. The door includes a latch-engaging surface that moves from a rest position when the door is opened. A latch pawl engages the latch-engaging surface of the door to prevent movement of the door to the open position when the latch pawl is in an engaged position. A push button actuator is disposed in a center portion of a dashboard structure. The push button actuator includes a cam surface that slidably engages the latch pawl and causes the latch pawl to move from the engaged position to a disengaged position to thereby unlatch the door.

19 Claims, 11 Drawing Sheets

STORAGE BOX LATCH WITH A REMOTELY LOCATED MECHANICAL PUSH BUTTON

FIELD OF THE INVENTION

The present invention generally relates to vehicle glove compartments, in particular to a mechanical latch release for a glove box.

BACKGROUND OF THE INVENTION

Various types of storage units such as glove boxes have been developed for motor vehicles. Glove boxes may include a bin having an opening, and a door that moves between open and closed positions to control access to a storage space inside the bin. A releasable latch may be utilized to retain the door in a closed position.

SUMMARY OF THE INVENTION

One aspect of the present disclosure is a storage bin assembly for vehicles. The assembly includes a dashboard structure having driver and passenger portions and a center portion disposed between the driver and passenger portions. A bin is mounted to the passenger portion. The bin may include vertically spaced-apart upper and lower walls, horizontally spaced-apart upright first and second sidewalls, and a rear wall. The upper and lower walls and the upright first and second sidewalls have peripheral portions forming an opening that provides access to a storage space of the bin. The bin assembly further includes a door that is pivotably mounted to the bin for rotation between open and closed positions. The door substantially closes off the opening when the door is in the closed position. The door includes a latch-engaging surface that moves from a rest position to an open position when the door is moved from the closed position to the open position. The bin assembly further includes a horizontally-extending latch pawl that translates substantially horizontally between engaged and disengaged positions. The latch pawl includes a first end that engages the latch-engaging surface of the door and prevents movement of the latch-engaging surface from the rest position to the open position when the latch is in the engaged position to thereby prevent movement of the door to the open position. The latch permits movement of the latch-engaging surface from the rest position to the open position when the latch is in the disengaged position. The storage bin assembly may include a resilient member biasing the latch pawl toward the disengaged position. The bin assembly further includes an actuator movably connected to the center portion of the dashboard structure for movement between a rest position and an actuated position. The actuator includes a cam surface that is configured to slidably engage a second end of the latch pawl that is opposite the first end of the latch pawl such that movement of the actuator from the rest position to the actuated position causes the latch pawl to translate substantially horizontally from the engaged position to the disengaged position to thereby unlatch the door.

Embodiments of the first aspect of the invention can include any one or a combination of the following features:

The storage bin assembly may include a push button that is operably connected to the actuator.

The door may optionally include first and second pivot arms that are pivotably connected to the bin.

The door may optionally include a panel that substantially closes off the opening of the bin when the door is in the closed position.

The first and second pivot arms may extend inwardly from the panel, and may include first and second pivot structures, respectively, that are pivotably connected to the bin.

The first pivot arm may optionally include a cantilevered end portion that is disposed inwardly of the first pivot structure.

The latch-engaging surface of the door may be formed by the end portion of the first pivot arm.

The latch-engaging surface may optionally face downwardly when the door is in a closed position.

The first end of the latch pawl may optionally include an upwardly-facing latch surface that is directly adjacent the latch-engaging surface when the latch pawl is in the engaged position.

The first and second sidewalls of the bin may optionally include oppositely-facing inner and outer sides, wherein the first pivot arm of the door is disposed outside the bin adjacent the outer side of the bin.

The bin may optionally include a deformation-limiting rib protruding from the outer side of the first sidewall of the bin.

The deformation-limiting rib may include an edge surface positioned a predefined clearance distance from the cantilevered end portion of the first pivot arm when the door is in a closed position, the latch is in the engaged position, and a force is not being applied to open the door, whereby the edge surface of the deformation-limiting rib limits deformation of the end portion of the first pivot arm when a force is applied to the door to thereby ensure that the latch-engaging surface remains in contact with the latch surface of the latch pawl.

The dashboard structure may optionally include a housing that slidably supports the latch pawl for substantially linear horizontal movement between the engaged and disengaged positions of the latch pawl.

The housing may optionally include a support surface adjacent the first end of the latch pawl when the latch pawl is in the engaged position to limit movement of the first end of the latch pawl when a force is applied to the first end of the latch pawl by the end portion of the first pivot arm when an opening force is applied to the door.

The housing may optionally include a wall having an opening, and the first end of the latch pawl may extend through the opening.

The wall of the housing may be upright, and the latch may include a horizontally-extending base portion, and a transverse arm extending upwardly from the base portion to the first end of the latch pawl, wherein the first end extends horizontally through the opening in the wall of the housing.

The housing may optionally include a first component having a horizontally-extending U-shaped portion that is U-shaped in cross-section and opens upwardly.

The transverse arm of the latch pawl may extend upwardly out of the U-shaped portion.

The U-shaped portion may optionally include an end that opens horizontally, and the housing may include a pawl-retaining bracket that is secured to the end of the first component to substantially close off the end and retain a shape of the end of the first component.

The pawl-retaining bracket may include at least a pair of connectors, wherein each connector comprises a groove.

The first component may optionally include a base wall and spaced-apart sidewalls extending from the base wall to form the U-shaped cross-section.

The spaced-apart sidewalls may optionally include edges at the end of the U-shaped portion that are received in the grooves of the connectors to retain the pawl-retaining bracket on the end of the first component and to retain the spaced-apart sidewalls at a predefined distance from each other.

Each of the spaced-apart sidewalls of the first component may optionally include a barbed connector.

Each connector of the pawl-retaining bracket may optionally include first and second spaced-apart tabs, wherein the first tab includes retaining surfaces that engage the barbed connectors to retain the pawl-retaining bracket on the first component.

The housing may be configured to slidably support the push button for substantially linear movement between the rest and actuated positions.

The second end of the latch pawl may include an angled slide surface that slidably engages the cam surface of the button whereby substantially linear movement of the push button causes the latch pawl to shift from the engaged position to the disengaged position.

The second end of the latch pawl may optionally include a pair of vertically spaced-apart substantially linear angled slide surfaces having a gap therebetween.

The button may include an inner portion extending through the gap.

The button may include vertically spaced-apart cam surfaces that slidably engage the slide surfaces of the latch pawl.

The resilient member may optionally comprise a first spring that engages the second end of the latch pawl.

The bin assembly may optionally include a second spring disposed on the inner portion of the push button to bias the push button toward the rest position.

The bin assembly may optionally include a third spring rotatably biasing the door toward the closed position.

Another aspect of the present invention is a storage bin assembly for vehicles. The bin assembly includes a dashboard structure having driver and passenger portions and a center finish panel disposed between the driver and passenger portions. The center finish panel includes a horizontally spaced-apart left and right vent openings that are configured to supply air to a vehicle interior. The bin assembly includes a bin mounted to the passenger portion of the dashboard structure. The bin includes vertically spaced-apart horizontal upper and lower walls and horizontally spaced-apart upright first and second sidewalls extending between the upper and lower walls to form a storage space and an opening that provides access to the storage space. The bin assembly includes a door that is pivotably mounted to the bin for rotation between open and closed positions. The door is configured to close off the opening when the door is in the closed position. The bin assembly further includes a pawl support structure disposed outside the first sidewall of the bin. The bin assembly further includes a latch pawl that is movably supported by the pawl support structure for substantially horizontal reciprocating motion towards the first side of the bin to an engaged position, and away from the first sidewall of the bin to a disengaged position. The latch pawl has an end portion that engages the door and retains the door in a closed position when the latch pawl is in the engaged position. The bin assembly further includes an actuating member movably disposed in the center finishing panel. The actuating member is configured to be manually moved inwardly by a user. The actuating member is operably connected to the latch pawl such that the latch pawl moves from the engaged position to a disengaged position when the actuating member is moved inwardly by a user.

Embodiments of the second aspect of the invention can include any one or a combination of the following features:

The latch pawl may include an angled cam surface that is slidably engaged by the movable actuating member as the movable actuating member is moved inwardly to move the latch pawl from the engaged position to the disengaged position.

The pawl support structure may comprise a housing having a first component including a base wall and sidewalls forming a U-shaped portion. The sidewalls may have upright end edges.

The housing may include a pawl-retaining bracket having connectors engaging the upright end edges of the sidewalls to maintain a spacing between the sidewall s.

The door may include first and second pivot arms that are pivotably connected to the upright first and second sidewalls, respectively, of the bin.

The first pivot arm may optionally include an end having a surface that is configured to engage the end portion of the latch pawl to prevent opening of the door when the latch pawl is in the engaged position.

The first sidewall of the bin may optionally include a deformation-limiting surface that is positioned directly adjacent the end of the first pivot arm when the door is closed to thereby retain the end of the first pivot arm in an engaged position contacting the end portion of the latch pawl.

The bin assembly may optionally include a spring biasing the latch pawl towards the engaged position.

Another aspect of the present invention is a method of assembling a storage bin for vehicles. The method includes positioning a push button in a center finish panel of a dashboard, and mechanically interconnecting the push button to a latch pawl that extends horizontally between the push button and a movable glove compartment door such that inward movement of the push button shifts the latch pawl away from the glove compartment door and disengages the latch pawl from the glove compartment door to permit opening of the glove compartment door.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2 is a partially fragmentary perspective view of the bin and door of FIG. 1;

FIG. 2A is a partially schematic exploded perspective view showing the bin and door of

FIG. 2;

DETAILED DESCRIPTION OF THE PREFERRED EMBODIMENTS

Figure 1:
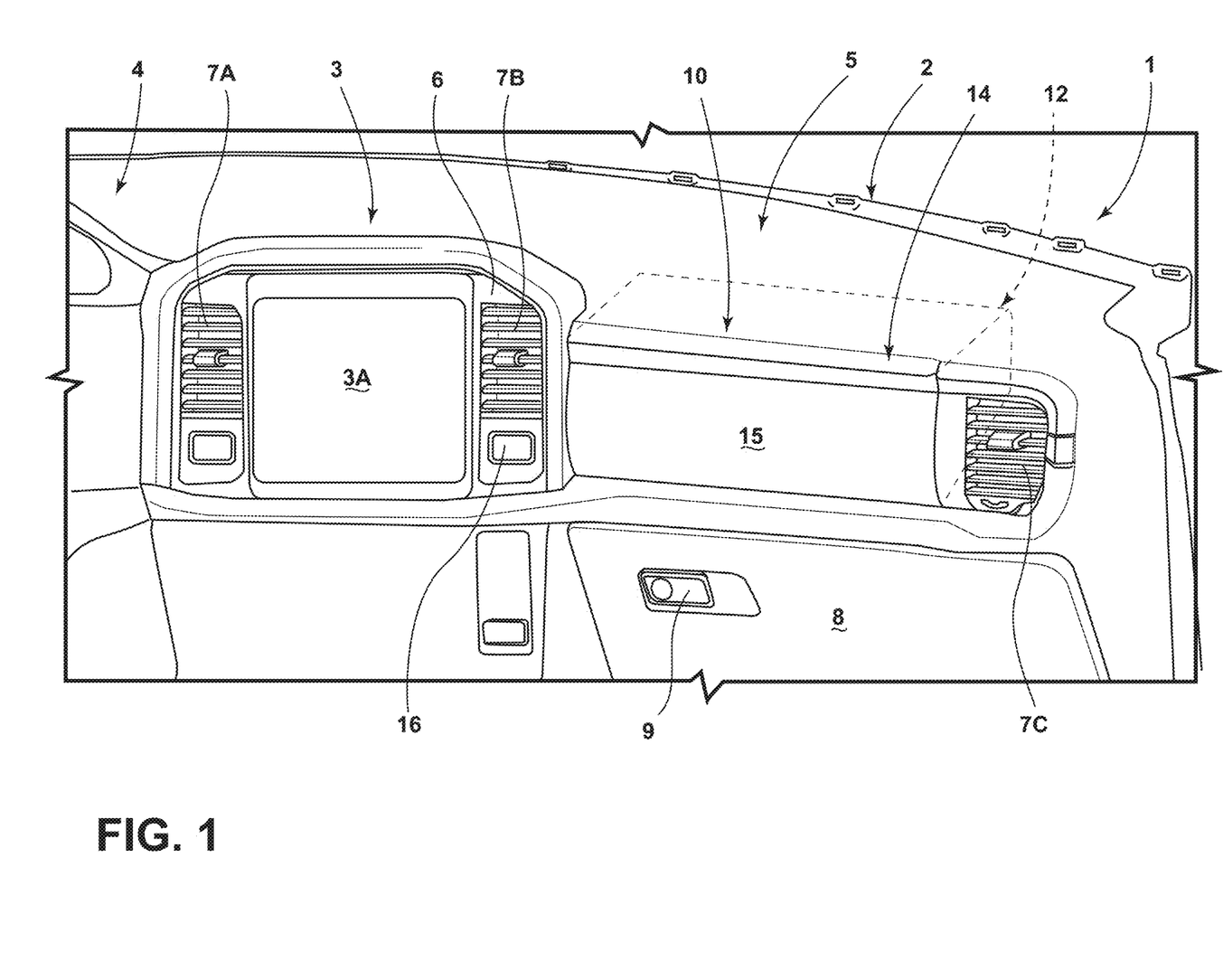
FIG. 1 is a partially fragmentary perspective view of a vehicle dashboard including a storage bin and door.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle 1 includes a dashboard structure 2 having a central portion 3 that is disposed between a driver's portion 4 and a passenger's portion 5. The central or center portion 3 includes a finish panel 6 that may include one or more vent openings 7A, 7B. Center portion 3 may include a display screen 3A. The dashboard may include one or more additional vent openings 7C. A lower glove compartment door 8 may be configured to open upon actuation of latch release 9.

An upper storage box or bin assembly 10 includes a box or bin 12 (see also FIG. 2) that is configured to be secured to the dashboard structure 2, and a door 14 that is movably mounted to the bin 12. As discussed in more detail below, a push button 16 may be mounted in the finish panel 6 of central portion 3 of dashboard 2. In use, a user pushes inwardly on push button 16 to shift an actuator 64 inwardly from a rest position to an actuated position 64A (FIG. 4), thereby causing latch pawl 40 (FIG. 3A) to shift/translate horizontally to a disengaged position 40A to mechanically release the door 14. This permits a user to move the door 14 to an open position 14A (FIG. 2) to access storage space 18 through bin opening 20.

Figures 2, 2A:
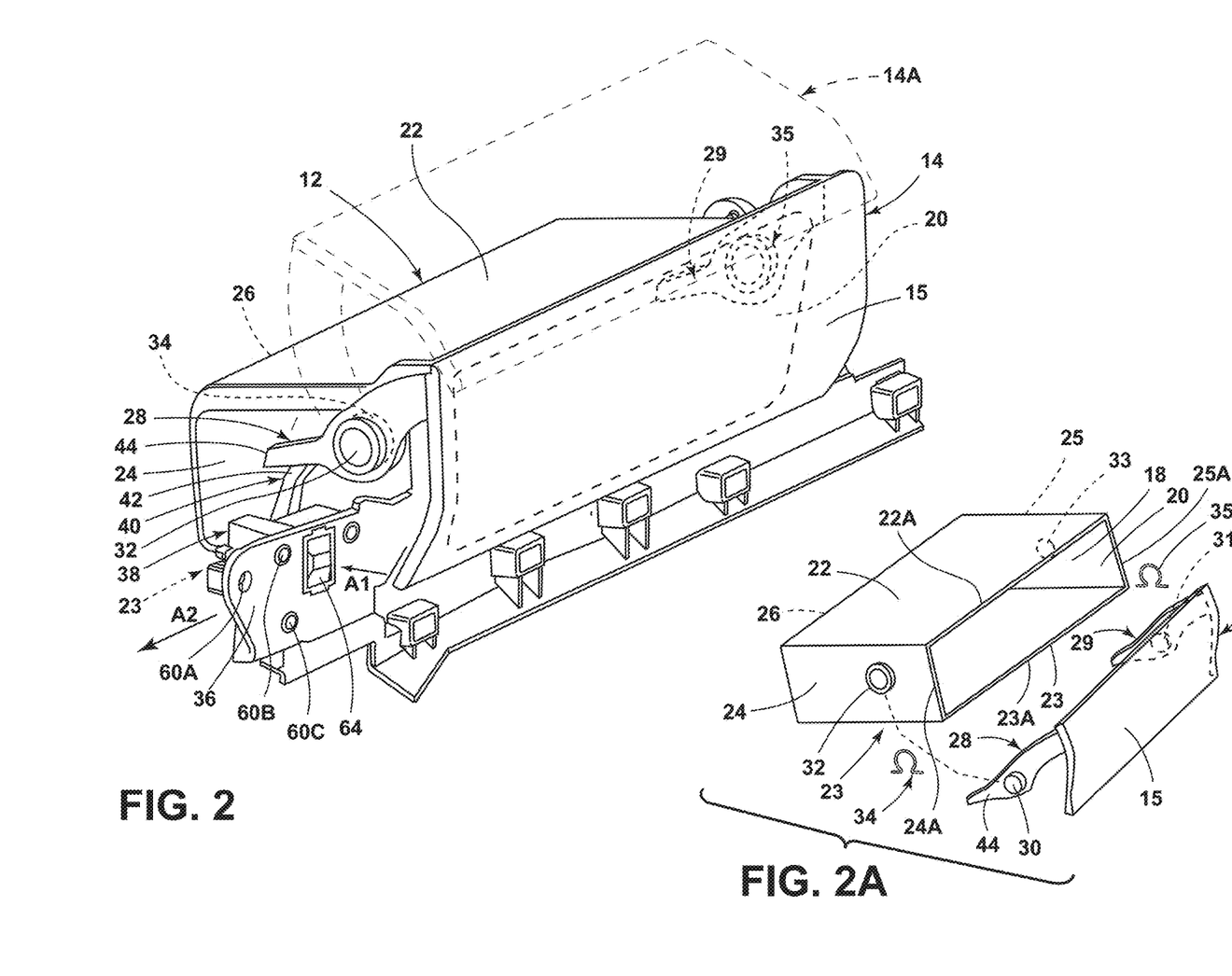

With reference to FIGS. 2 and 2A, bin 12 includes a storage space 18 that may be formed by vertically spaced-apart upper and lower sidewalls 22 and 23, respectively, and horizontally spaced-apart first and second upright sidewalls 24 and 25, respectively, and a rear or base wall 26. Sidewalls 22-25 include peripheral portions 22A-25A (FIG. 2A), respectively, extending around opening 20. Door 14 includes a front panel 15 and first and second pivot arms 28 and 29, respectively, that extend inwardly from front panel 15. Pivot arms 28 and 29 include pivot structures such as openings 30 and 31 that pivotably engage corresponding pivot structures such as bosses or protrusions 32 and 33 of bin 12 to thereby pivotably mount the door 14 to the bin 12. Bin assembly 10 may optionally include one or more torsion springs 34 and 35 that interconnect the bin 12 and door 14 and bias the door 14 to the open position 14A. Torsion springs 34 and 35 may provide sufficient torsional bias to cause door 14 to move to the open position upon release of latch pawl 40. Alternatively, torsion springs 34 and 35 may provide torsional bias to assist opening door opening 14 that is less than a bias required to open door 14, such that a user is required to apply some force to door 14 in order to open door 14. Bin 12 may include a side mounting structure 36 that supports a housing 38 adjacent first sidewall 24 of bin 12. As discussed in more detail below, housing 38 movably (e.g. slidably) supports latch pawl 40 for horizontal translating motion between the engaged (latched) position and the disengaged (unlatched) position 40A. When latch pawl 40 is in the engaged position, end 42 (FIG. 3) of latch pawl 40 engages end 44 of first pivot arm 28 to prevent rotation of door 14 from the closed position to the open position 14A. To unlatch door 14, a user applies an inward force in the direction of the arrow "A1" (FIG. 2) on button 16 (FIG. 1) to shift outer button 80 to an inner or actuated position 80A (FIG. 5) and also shift push button actuator 64 to the inner or actuated position 64A (FIG. 4), thereby causing the latch pawl 40 to shift away from first sidewall 24 of bin 12 in the direction of the arrow "A2" to the disengaged position 40A (FIG. 4), thereby disengaging end 42 of latch pawl 40 from end 44 of first pivot arm 28 of door 14 to thereby permit rotation of first pivot arm 28 and door 14 from the closed position to the open position.

Figures 3, 3A:
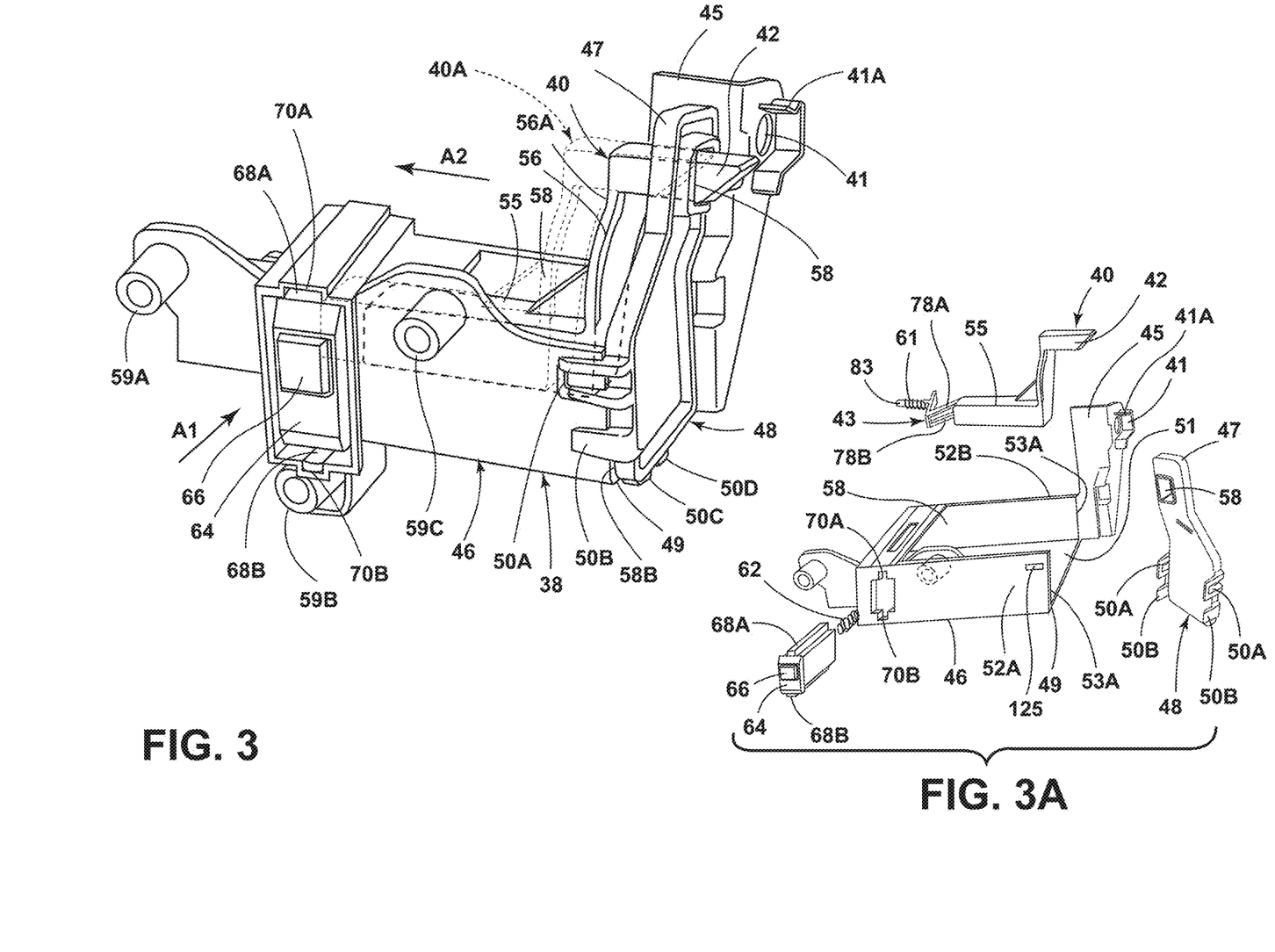
FIG. 3 is a perspective view of the housing, latch pawl, and push button actuator.
FIG. 3A is a partially schematic exploded perspective view showing the housing, latch pawl, and push button actuator of FIG. 3.

With further reference to FIGS. 3 and 3A, housing 38 includes a first component 46, and a second component such as pawl-retaining bracket 48 that is secured to open end 49 of first component 46 via connectors 50A, 50B, 50C, 50D, etc. The first component 46 is generally U-shaped in cross-section adjacent end 49, and includes a base wall 51 and upright sidewalls 52A and 52B having end edges 53A and 53B, respectively.

With reference to FIG. 3A, latch pawl 40 includes a horizontally-extending base portion 55 that is slidably received in first component 46 of housing 38, and a transverse arm portion 56 that extends upwardly through opening 58 in first component 46. First end 42 of latch pawl 40 extends horizontally from upper end 56A of transverse arm 56 through an opening 58 of pawl-retaining bracket 48. The base 55, transverse arm 56, and first end 42 of latch pawl 40 may be integrally formed. For example, the latch pawl 40 may comprise a one-piece molded polymer unit. As discussed in more detail below, the first end 42 of latch pawl 40 is supported in opening 58 of pawl-retaining bracket 48 to prevent or limit flexing of latch pawl 40 if a force is applied to first end 42 of latch pawl 40 by first pivot arm 28 (FIG. 2) of door 14 when an opening force is applied to the door 14 while the latch pawl 40 is in an engaged or latched position.

The first component 46 of housing 38 may include a plurality of connecting structures such as bosses 59A-59C that receive threaded fasteners to secure the housing 38 to mounting structure 36 of bin 12 (FIG. 2) at openings 60A-60C, respectively. First component 46 of housing 38 may include an upwardly-extending portion 45 that supports an upper end 47 of pawl-retaining bracket 48. Upper portion 45 of first component 46 may include an opening 41 that receives a threaded fastener such as a bolt 105 (FIG. 6) to secure the upper portion 45 of first component 46 of housing 38 to the first sidewall 24 of bin 12. A rib structure 41A may be provided on upper portion 45 of first component 46 to provide support and to provide proper spacing of upper portion 45 of first component 46 relative to the first sidewall 24 of bin 12. First component 46 and pawl-retaining bracket 48 of housing 38 may comprise molded polymer or other suitable material.

As discussed in more detail below, a pawl spring 61 (FIG. 3A) biases latch pawl 40 to the engaged position (i.e. opposite the arrow A2, FIG. 3), and a push button spring 62 (FIG. 3A) biases push button actuator 64 outwardly (i.e. opposite the arrow A1, FIG. 3).

Referring again to FIGS. 3 and 3A, push button actuator 64 may comprise a body 66 having upper and lower ribs or slides 68A and 68B, respectively, that slidably engage upper and lower channels 70A and 70B, respectively of first component 46 of housing 38 to movably connect the actuator 64 to housing 38 and center portion 3 of dashboard 2 (FIG. 1) and to provide for sliding motion of body 66 in the direction of the arrow A1, and in the direction opposite the arrow A1.

Figure 4:
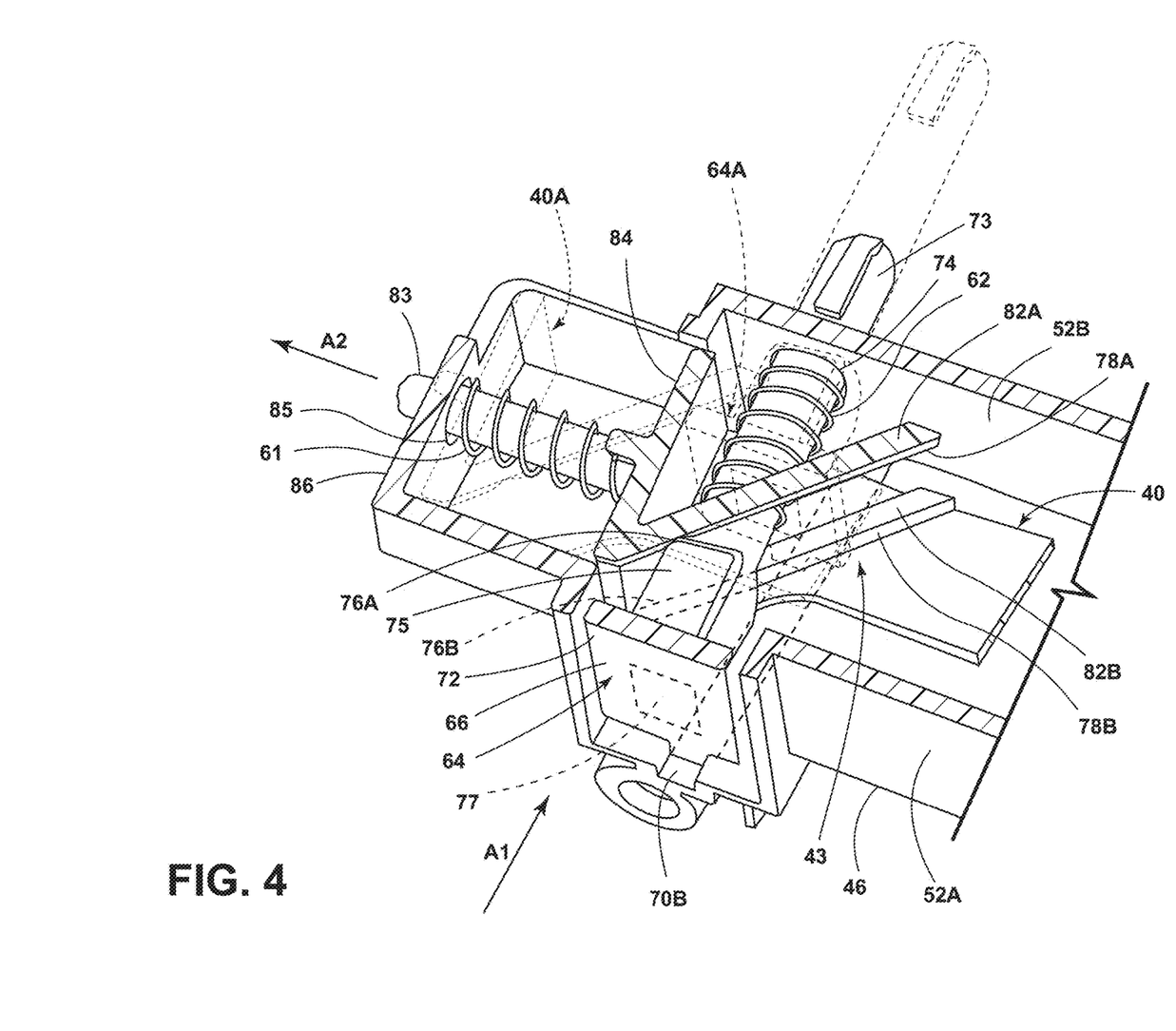
FIG. 4 is a partially fragmentary isometric cross-sectional view of the push button and an end portion of the latch pawl.

With reference to FIG. 4, the body 66 of push button actuator 64 includes an outer portion 72 and an extension 73 that extends through an opening 74 in sidewall 52B of first component 46 of housing 38. Body 66 further includes an inner portion 75 having upper and lower cam surfaces 76A and 76B, respectively, that slidably engage upper and lower angled ramp surfaces 78A and 78B formed by angled portions 82A and 82B, respectively (see also FIG. 6) at second end 43 of latch pawl 40. Spring 62 contacts sidewall 52B of first component 46 of housing 38 and inner portion 75 of body 66 of push button actuator 64 to thereby bias the push button actuator 64 in the direction opposite the arrow A1. A foam pad 77 may be positioned on outer portion 72 of body 66 to accommodate variations during manufacture and to eliminate noise that could otherwise result from contact with end 79 (FIGS. 5 and 6) of outer button 80. Second end 43 of latch pawl 40 includes a prong or extension 83 (FIG. 4) that extends from an end wall 84 of latch pawl 40. The prong or extension 83 extends through an opening 85 in an end wall 86 of first component 46 of housing 38, and spring 61 is disposed on the extension 83. The spring 61 contacts the end wall 84 of latch pawl 40 and end wall 86 of first component 46 of housing 38 such that compression of spring 61 biases the latch pawl 40 in an engaged direction opposite the arrow A2.

As described in more detail below, in use, a force applied to outer button 80 button 16 (FIG. 6) generates a force on actuator 64 in the direction of the arrow A1 (FIG. 4) thereby shifting actuator 64 in the direction of the arrow A1 to the actuated position 64A. As the actuator 64 moves inwardly in the direction of the arrow A1, the cam surfaces 76A and 76B slide along the angled ramp surfaces 78A and 78B, respectively, of latch pawl 40, thereby shifting or translating the latch pawl 40 in the direction of the arrow A2 to the unlatched position 40A to unlatch the latch pawl 40.

Figure 5:
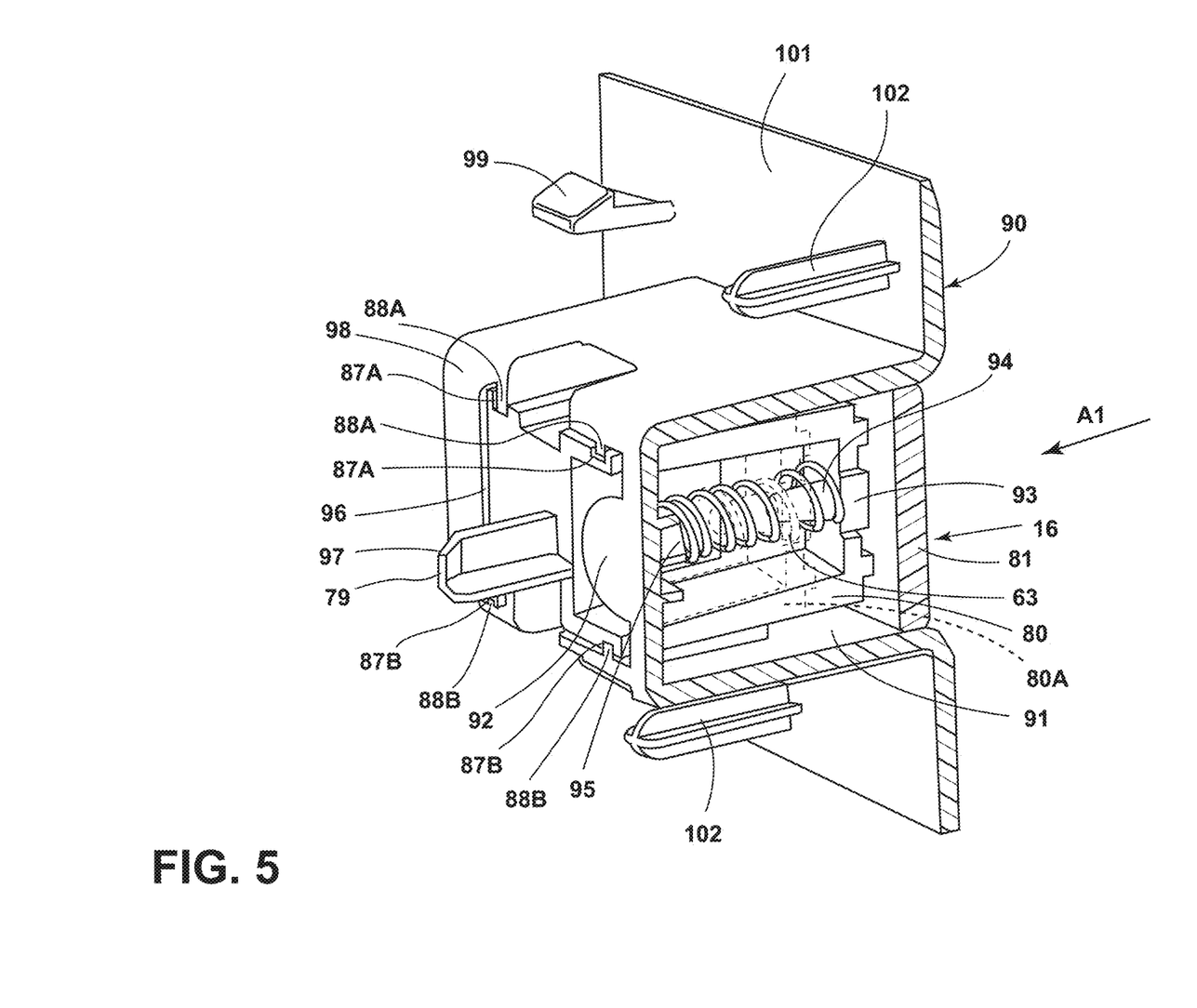
FIG. 5 is a cross-sectional view of the outer push button assembly and bezel.
Figure 6:
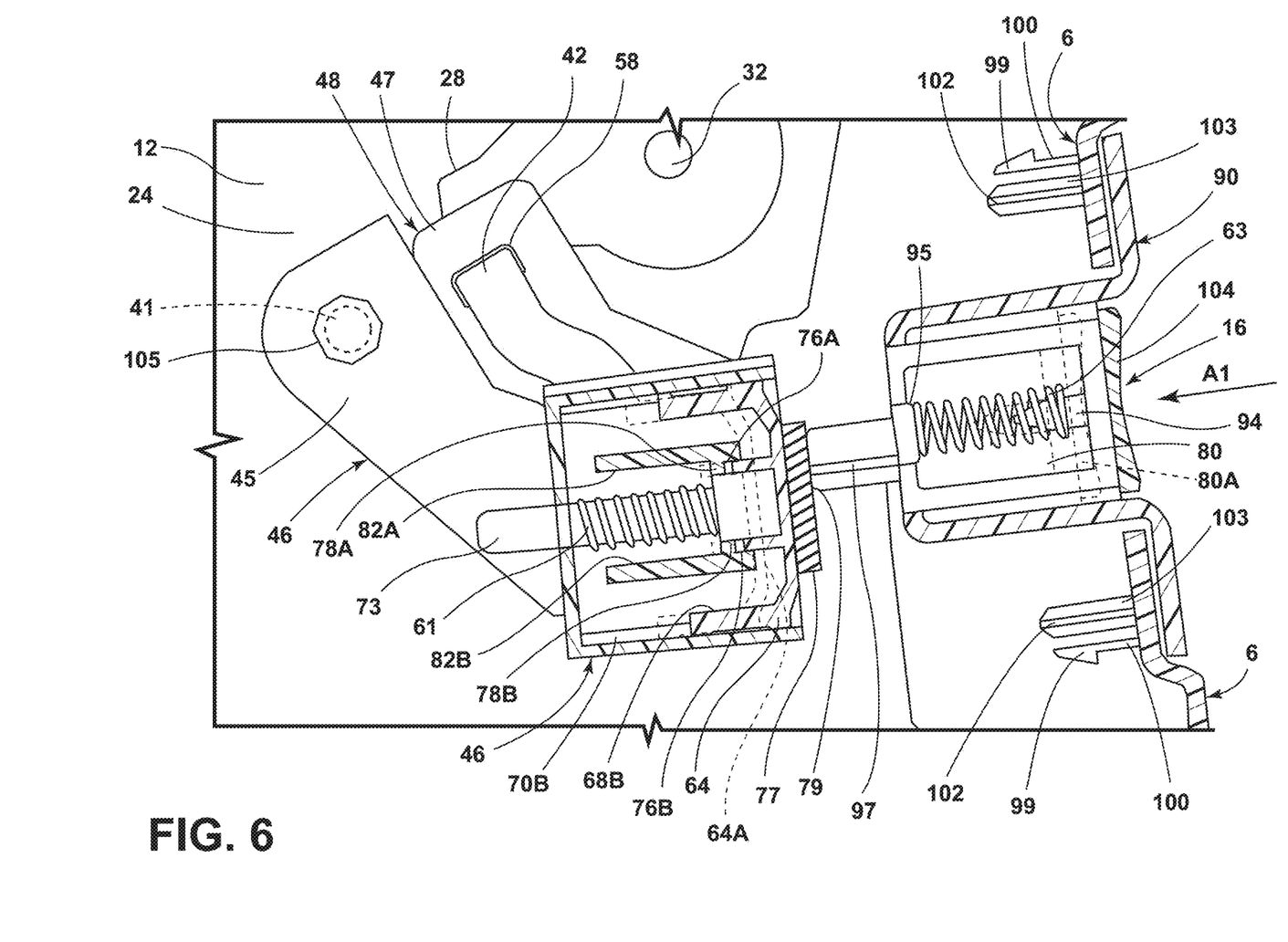
FIG. 6 is a partially fragmentary cross-sectional view of the outer push button assembly, the push button actuator, and the latch pawl.

With further reference to FIG. 5, the push button 16 includes an outer button member or carrier 80 that includes a plurality of elongated linear channels 87A and 87B that slidably engage raised ribs 88A and 88B of bezel 90 to movably (slidably) support outer button member 80 in recess 91 of bezel 90. Button 16 may include an outer pad or button 81 that is secured to the button carrier 80 utilizing barbed connectors 93. An outer spring 63 biases button carrier 80 outwardly. The button carrier 80 may include a prong or extension 94 that engages outer spring 63, and bezel 90 includes a pad structure 92 having a spring support structure 95 that also engages and supports outer spring 63. Button carrier 80 includes an extension 97 that protrudes through an opening 96 in a rear wall 98 of bezel 90 and engages resilient foam pad 77 of actuator 64 (FIG. 6). Flange 101 of bezel 90 (FIG. 5) may include a plurality of barbed connectors 99 (see also FIG. 6) that engage openings 100 in finish panel 6 to retain bezel 90 to finish panel 6. Bezel 90 may also include one or more bosses 102 that project inwardly from flange 101 of bezel 90. Bosses 102 extend through openings 103 in finish panel 6 to support and locate the bezel 90 when installed on finish panel 6. In use, a user applies a force to button member 80, thereby moving button member 80 inwardly to position 80A.

With further reference to FIG. 6, when assembled, bezel 90 is secured to finish panel 6 of the central portion 3 of dashboard structure 2 (see also FIG. 1), with end 79 of extension 97 of outer button carrier in contact with resilient pad 77. The resilient pad 77 is secured to actuator 64, and actuator 64 is slidably disposed in first component 46 of housing 38 as discussed above. Thus, an inward force applied to an outer button member 104 in the direction of the arrow A1 will result in inward movement of outer button carrier 80 to actuated position 80A and movement of actuator 64 to actuated position 64A, thereby shifting the latch pawl 40 horizontally to the disengaged position 40A (see also FIG. 8) away from the sidewall 24 of bin 12, thereby disengaging first end 42 of latch pawl 40 from pivot arm 28 of door 14 and permitting the door 14 to open.

Figure 7:
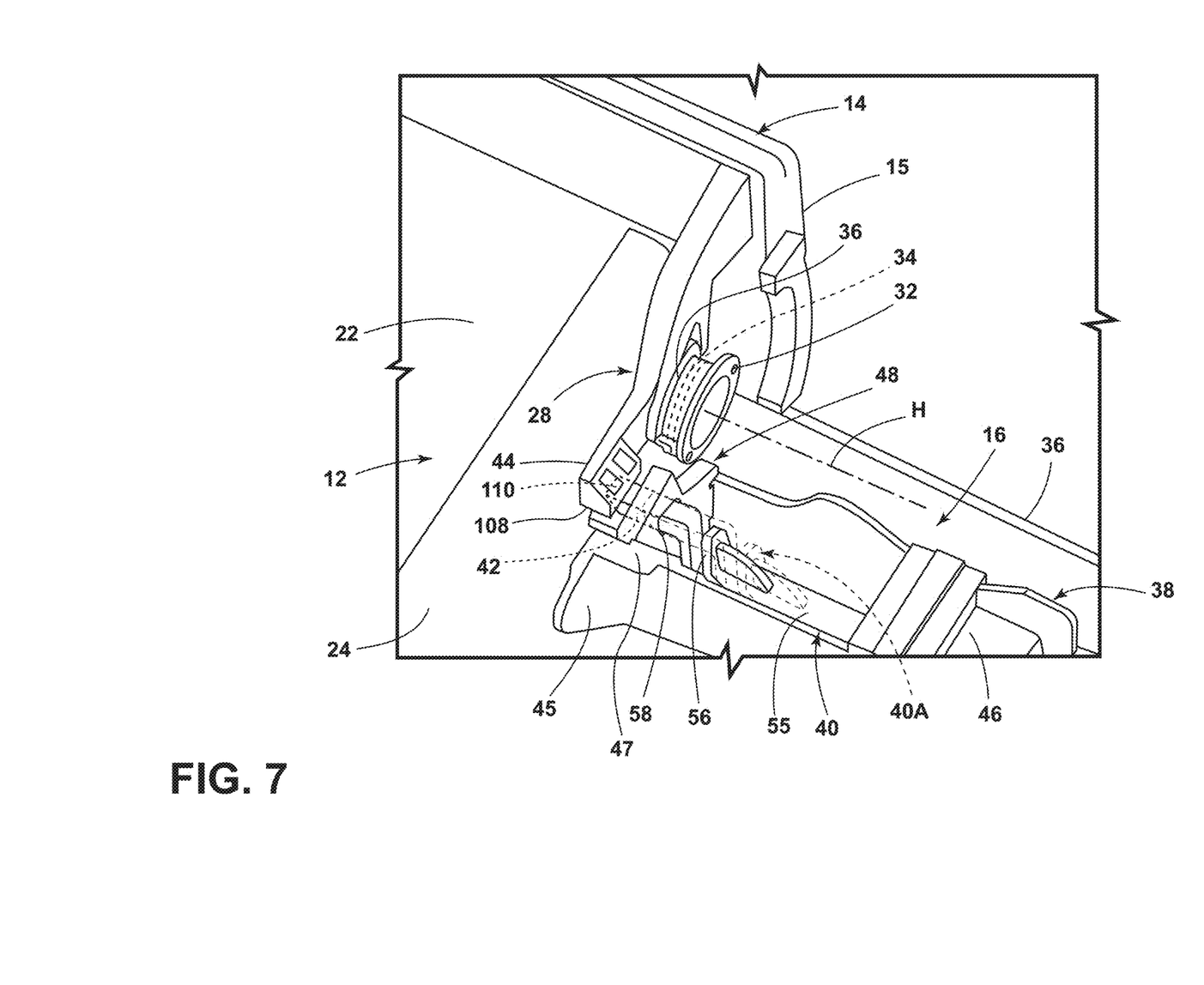
FIG. 7 is a partially fragmentary isometric view of the bin assembly showing the latch pawl and pivot arm of the bin door.
Figure 8:
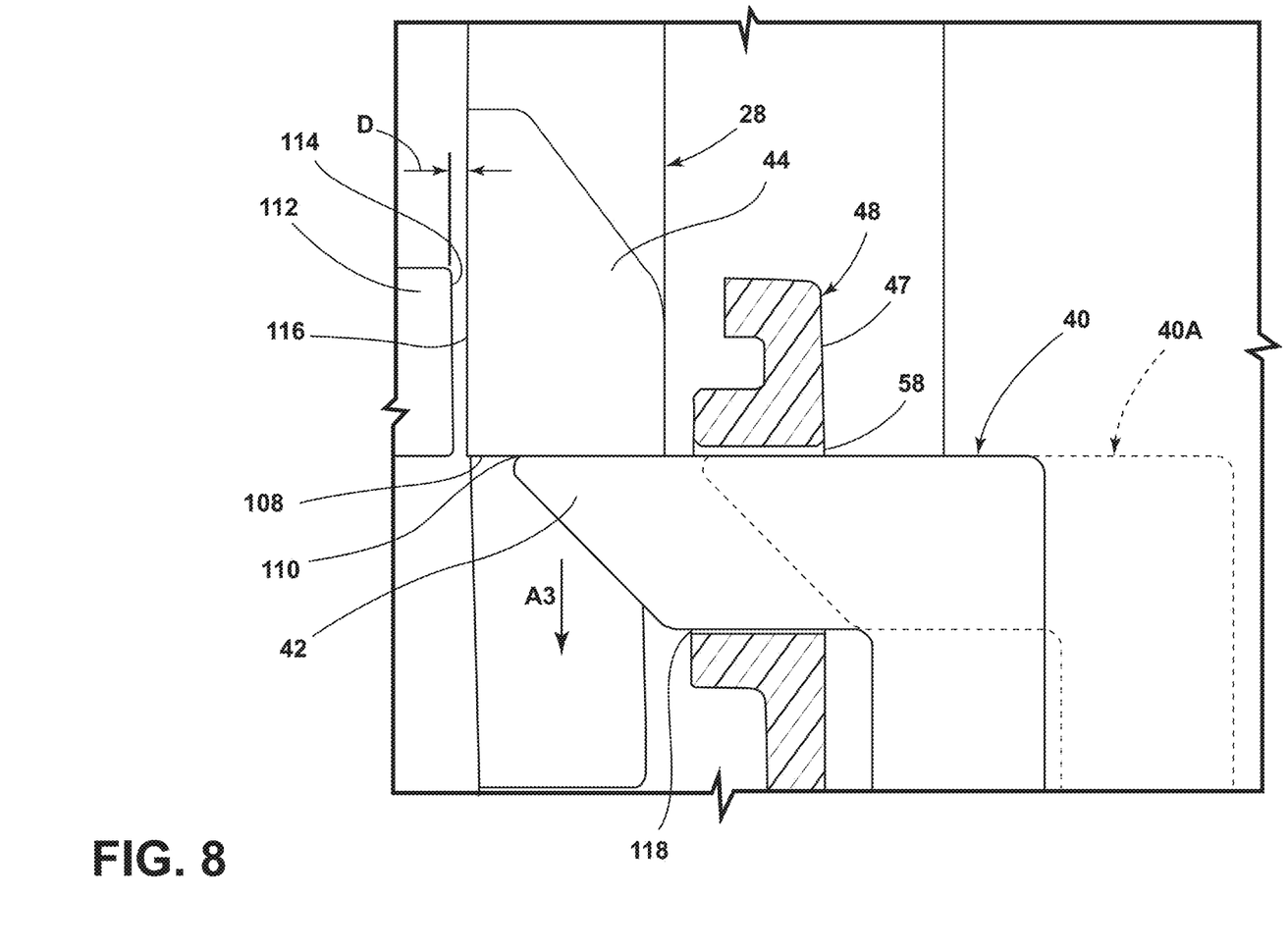
FIG. 8 is a partially fragmentary cross-sectional view showing the latch pawl engaging the pivot arm of the bin door.
Figure 9:
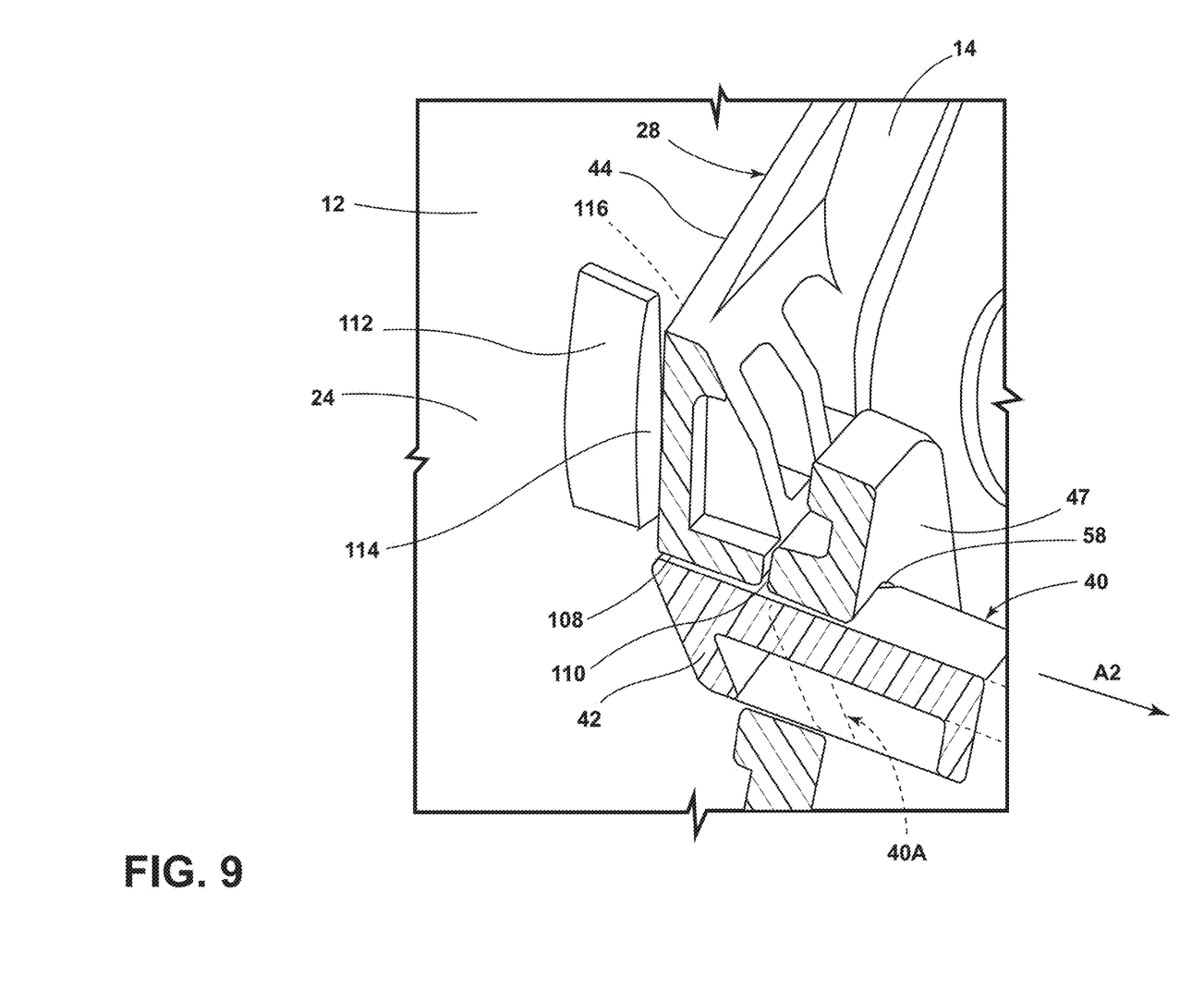
FIG. 9 is a partially fragmentary perspective view showing the latch pawl engaging the pivot arm of the bin door.

With further reference to FIGS. 7-9, first pivot arm 28 of door 14 includes an end 44 having a latch-engaging surface 108. Latch-engaging surface 108 is disposed directly adjacent upper surface 110 of first end 42 of latch pawl 40 when the door 14 is in the closed position and the latch pawl 40 is in the engaged position as shown in FIG. 7. As discussed above, torsion springs 34 may be operably interconnected to the door 14 and bin 12 to rotatably bias the door 14 towards the closed position.

With reference to FIGS. 8 and 9, bin 12 may include a deformation-limiting rib 112 that protrudes from first sidewall 24. Rib 112 includes an end surface 114 that is spaced-apart from side surface 116 of end 44 of pivot arm 28 a distance "D" (FIG. 8) when the door 14 is in the closed position. Distance D may be in the range of, for example, about 0.020 inches to about 0.100 inches. However, the distance D may also be outside this range, and the present disclosure is not limited to any specific dimension or range of dimensions. If a force is applied to open the door 14 when the latch pawl 40 is in the latched position (FIG. 9), contact between latch-engaging surface 108 of end 44 of arm 28 and upper surface 110 of end 42 of latch pawl 40 prevents rotation of door 14 to the open position. Door 14, including pivot arm 28, may be made of a polymer material, such that end 44 of arm 28 tends to deform when a force is applied to open door 14. However, deformation of end 44 of arm 28 is limited by the deformation-limiting rib 112. In particular, bending and deformation of the end 44 of arm 28 towards sidewall 24 of bin 12 is limited to the distance D (FIG. 8) because the surface 116 of end 44 of arm 28 will contact surface 114 of rib 112 as end 44 deforms. Opening 58 in pawl-retaining bracket 48 limits deformation of end 42 of latch pawl 40. For example, an opening force applied to door 14 will cause end 44 of arm 28 to generate a force on end 42 of latch pawl 40 acting in the direction of the arrow "A3" (FIG. 8). Surface 118 of opening 58 in pawl-retaining bracket 48 supports the end 42 of latch pawl 40 to thereby limit deformation of end 42 of latch pawl 40 due to forces applied to end 42 of latch pawl 40 by end 44 of arm 28.

Figure 10:
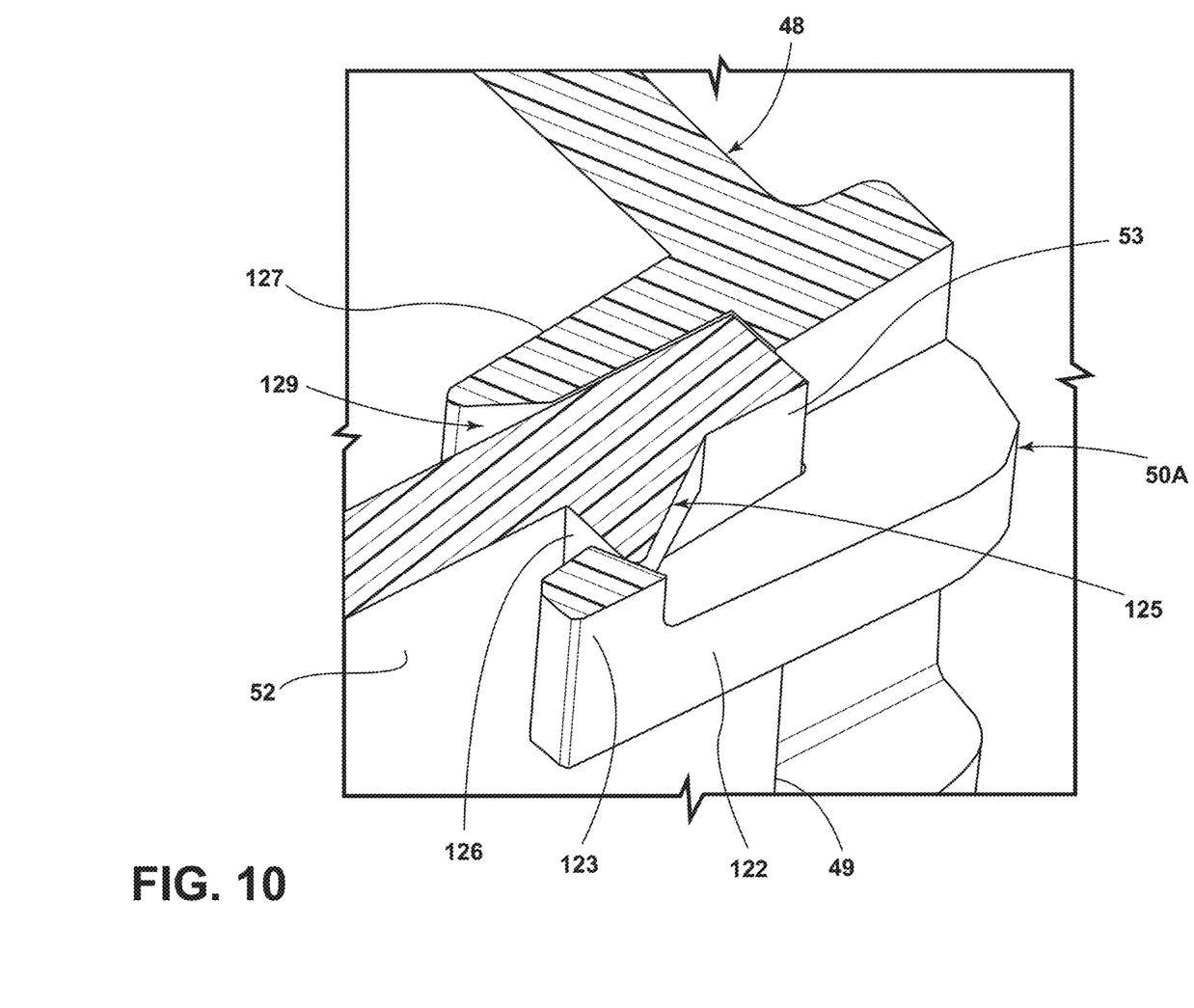
FIG. 10 is a partially fragmentary cross-sectional perspective view showing attachment of the pawl-retaining bracket to the housing.
Figure 11:
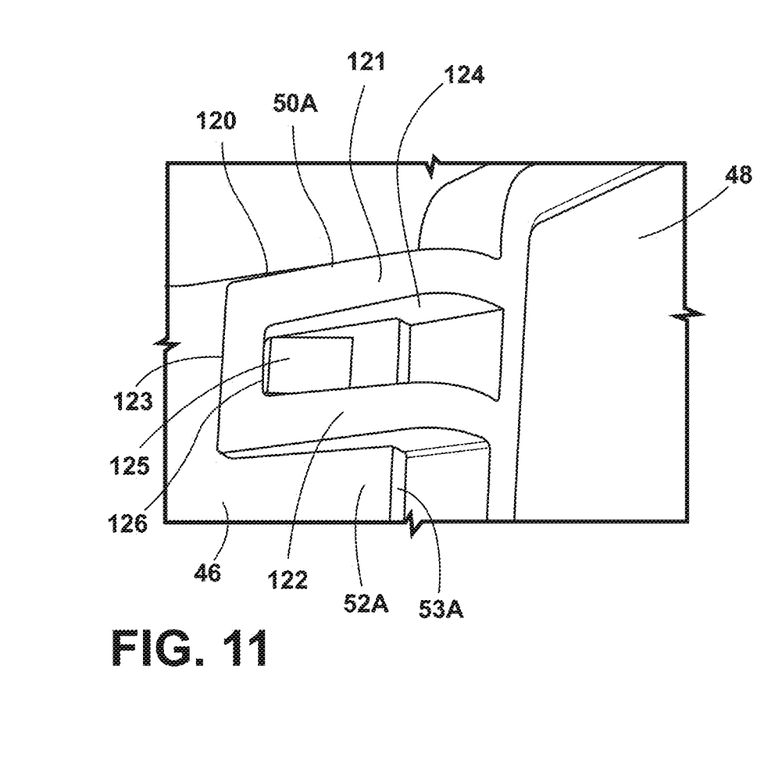
FIG. 11 is a partially fragmentary perspective view showing a snap connector that connects the pawl-retaining bracket to the housing.
Figure 12:
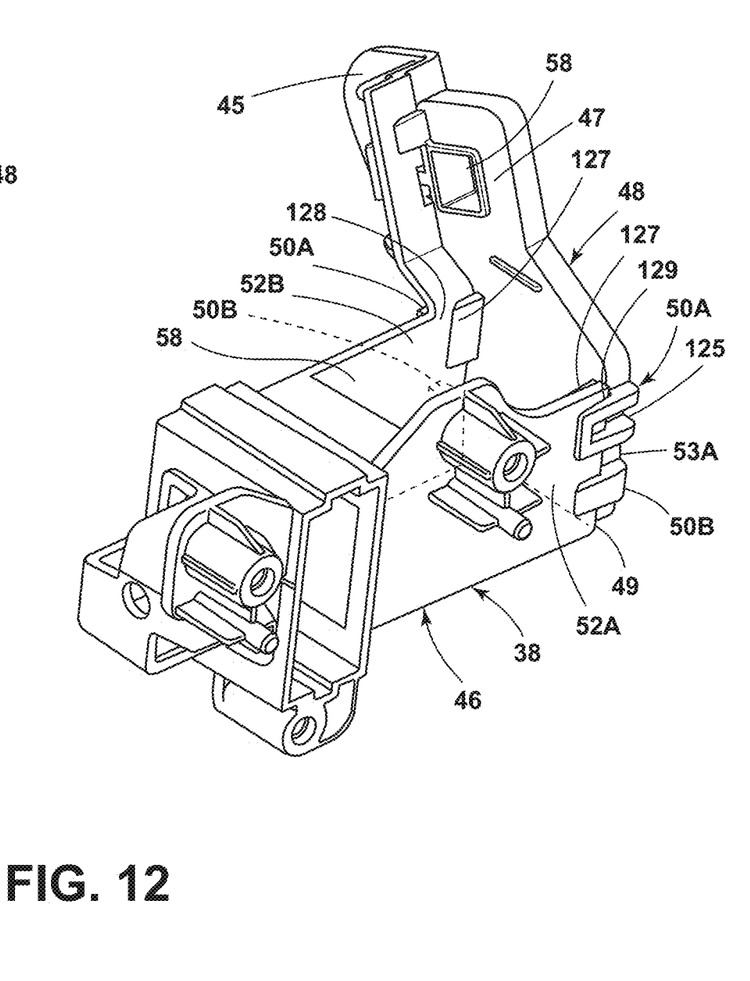
FIG. 12 is an isometric view of the housing and pawl-retaining bracket.

With further reference to FIGS. 10-12, pawl-retaining bracket 48 is secured to open end 49 of first component 46 of housing 38 via connectors 50A and 50B. Connectors 50A (FIG. 11) may include first tabs 120 having first and second legs 121 and 122, respectively, and an end leg 123 to form an opening 124. A tapered wedge 125 protrudes outwardly from sidewall 52A, and includes an end surface 126 that engages end leg 123 when pawl-retaining bracket 48 is installed to thereby retain the pawl-retaining bracket 48 on the first component 46. Connectors 50A may include inner tabs 127 (FIG. 12) that engage inner surface 128 of sidewalls 52 to thereby secure/retain the sidewalls 52A and 52B at a predefined spacing relative to one another. The tabs 120 and 127 form grooves or channels 129 that receive the edge portions 53A and 53B of sidewalls 52A and 52B.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A storage bin assembly for vehicles comprising:
a dashboard structure having driver and passenger portions and a center portion disposed between the driver and passenger portions;
a bin mounted to the passenger portion, the bin including vertically spaced-apart upper and lower walls, horizontally spaced-apart upright first and second sidewalls, and a rear wall, wherein the upper and lower walls and the upright first and second sidewalls have peripheral portions forming an opening to a storage space of the bin;
a door pivotably mounted to the bin for rotation between open and closed positions, the door including a latch-engaging surface that moves from a rest position to an open position when the door is moved from the closed position to the open position;
a horizontally-extending latch pawl that translates substantially horizontally between engaged and disengaged positions, wherein the latch pawl includes a first end that engages the latch-engaging surface of the door and prevents movement of the latch-engaging surface from the rest position to the open position when the latch pawl is in the engaged position to prevent movement of the door to the open position, and wherein the latch pawl permits movement of the latch-engaging surface from the rest position to the open position when the latch pawl is in the disengaged position;
an actuator disposed in the center portion of the dashboard structure for movement between rest and actuated positions, wherein the actuator includes a cam surface that is configured to slidably engage a second end of the latch pawl that is opposite the first end of the latch pawl such that movement of the actuator from the rest position to the actuated position causes the latch pawl to translate substantially horizontally from the engaged position to the disengaged position to unlatch the door.

2. The storage bin assembly of claim 1, including:
a push button operably connected to the actuator.

3. The storage bin assembly of claim 1, wherein:
the door includes a panel that substantially closes off the opening of the bin when the door is in the closed position and first and second pivot arms that extend inwardly from the panel and include first and second pivot structures, respectively, that are pivotably connected to the bin, the first pivot arm having a cantilevered end portion disposed inwardly of the first pivot structure, and wherein the latch-engaging surface of the door is formed by the end portion of the first pivot arm.

4. The storage bin assembly of claim 3, wherein:
the latch-engaging surface faces downwardly when the door is in a closed position;
the first end of the latch pawl includes an upwardly-facing latch surface that is directly adjacent the latch-engaging surface when the latch pawl is in the engaged position.

5. The storage bin assembly of claim 4, wherein:
the first and second sidewalls of the bin include oppositely-facing inner and outer sides, and wherein the first pivot arm of the door is disposed outside the bin adjacent the outer side of the bin;
and wherein the bin includes a deformation-limiting rib protruding from the outer side of the first sidewall of the bin, the deformation-limiting rib including an edge surface positioned a predefined clearance distance from the cantilevered end portion of the first pivot arm when the door is in a closed position, the latch is in the engaged position, and a force is not being applied to open the door, whereby the edge surface of the deformation-limiting rib limits deformation of the end portion of the first pivot arm when a force is applied to the door to cause the latch-engaging surface to remain in contact with the latch surface of the latch pawl.

6. The storage bin assembly of claim 5, wherein:
the dashboard structure includes a housing that slidably supports the latch pawl for substantially linear horizontal movement between the engaged and disengaged positions of the latch pawl;
and wherein the housing includes a support surface adjacent the first end of the latch pawl when the latch pawl is in the engaged position to limit movement of the first end of the latch pawl when a force is applied to the first end of the latch pawl by the end portion of the first pivot arm when an opening force is applied to the door.

7. The storage bin assembly of claim 6, wherein:
the housing includes a wall having an opening, and wherein the first end of the latch pawl extends through the opening.

8. The storage bin assembly of claim 7, wherein:
the wall of the housing is upright;
the latch pawl includes a horizontally-extending base portion and a transverse arm extending upwardly from the base portion to the first end of the latch pawl, and wherein the first end extends horizontally through the opening in the wall of the housing.

9. The storage bin assembly of claim 8, wherein:
the housing includes a first component having a horizontally extending first portion that is U-shaped in cross-section and opens upwardly, wherein the transverse arm of the latch pawl extends upwardly out of the first portion, the first portion having an end that opens horizontally;
the housing includes a pawl-retaining bracket secured to the end of the first component to substantially close off the end and retain a shape of the end of the first component.

10. The storage bin assembly of claim 9, wherein:
the pawl-retaining bracket includes at least a pair of connectors, each connector comprising a groove;
the first component includes a base wall and spaced-apart sidewalls extending from the base wall to form the U-shaped cross-section, and wherein the spaced-apart sidewalls include edges at the end of the first portion that are received in the grooves of the connectors to retain the pawl-retaining bracket on the end of the first component and to retain the spaced-apart sidewalls at a predefined distance from each other.

11. The storage bin assembly of claim 10, wherein:
each of the spaced-apart sidewalls of the first component includes a barbed connector;
each connector of the pawl-retaining bracket includes first and second spaced-apart tabs, wherein the first tab includes retaining surfaces that engage the barbed connectors to retain the pawl-retaining bracket on the first component.

12. The storage bin assembly of claim 6, wherein:
the housing slidably supports the actuator for substantially linear movement between the rest and actuated positions;
the second end of the latch pawl includes an angled slide surface that slidably engages the cam surface of the actuator whereby substantially linear movement of the actuator causes the latch pawl to shift from the engaged position to the disengaged position.

13. The storage bin assembly of claim 12, wherein:
the second end of the latch pawl includes a pair of vertically spaced-apart angled surfaces having a gap therebetween;
the actuator includes an inner portion extending through the gap.

14. The storage bin assembly of claim 12, including:
a first spring that engages the second end of the latch pawl towards the disengaged position;
a second spring disposed on the inner portion of the actuator and biasing the actuator towards the rest position;
a third spring rotatably biasing the door towards the closed position.

15. A storage bin assembly for vehicles comprising:
a dashboard structure having driver and passenger portions and a center finish panel disposed between the driver and passenger portions, the center finish panel including horizontally spaced-apart left and right vent openings that are configured to supply air to a vehicle interior;
a bin mounted to the passenger portion of the dashboard structure, the bin having vertically spaced-apart horizontal upper and lower walls and horizontally spaced-apart upright first and second side walls extending between the upper and lower walls to form a storage space and an opening that provides access to the storage space;
a door pivotably mounted to the bin for rotation between open and closed positions, wherein the door closes off the opening when the door is in the closed position;
a pawl support structure disposed outside the first side wall of the bin;
a latch pawl movably supported by the pawl support structure for substantially horizontal reciprocating motion towards the first side wall of the bin to an engaged position and away from the first side wall of the bin to a disengaged position, the latch pawl having an end portion that engages the door and retains the door in the closed position when the latch pawl is in the engaged position;
an actuating member movably disposed in the center finish panel, wherein the actuating member is configured to be manually moved inwardly by a user, and wherein the actuating member is operably connected to the latch pawl such that the latch pawl moves from the engaged position to a disengaged position when the actuating member is moved inwardly.

16. The storage bin assembly of claim 15, wherein:
the latch pawl includes an angled cam surface that is slidably engaged by the movable actuating member as the movable actuating member is moved inwardly to thereby move the latch pawl from the engaged position to the disengaged position.

17. The storage bin assembly of claim 15, wherein:
the pawl support structure comprises a housing having a first component including a base wall and sidewalls forming a U-shaped portion, wherein the sidewalls have upright end edges;
the housing includes a pawl-retaining bracket having connectors engaging the upright end edges of the sidewalls to maintain a spacing between the sidewalls.

18. The storage bin assembly of claim 15, wherein:
the door includes first and second pivot arms pivotably connected to the upright first and second sidewalls, respectively, of the bin;
the first pivot arm includes an end having a surface that is configured to engage the end portion of the latch pawl to prevent opening of the door when the latch pawl is in the engaged position;
the first sidewall of the bin includes a deformation-limiting surface that is positioned directly adjacent the end of the first pivot arm when the door is closed to retain the end of the first pivot arm in an engaged position contacting the end portion of the latch pawl.

19. The storage bin assembly of claim 15, including:
a spring biasing the latch pawl towards the engaged position.

* * * * *